United States Patent [19]

Cohen et al.

[11] Patent Number: 5,117,424
[45] Date of Patent: May 26, 1992

[54] METHOD AND APPARATUS FOR SETTING CLOCK SIGNALS TO PREDETERMINED PHASES AT REMOTE BROADCAST SITES IN SIMULCAST SYSTEMS

[75] Inventors: Richard Cohen; Rickie W. Wallace, both of Arlington, Tex.

[73] Assignee: ElectroCom Automation L.P., Arlington, Tex.

[21] Appl. No.: 603,394

[22] Filed: Oct. 26, 1990

Related U.S. Application Data

[63] Continuation of Ser. No. 382,264, Jul. 20, 1989, Pat. No. 4,972,410.

[51] Int. Cl.$^5$ .............................................. H04B 7/00
[52] U.S. Cl. .............................. 370/105.5; 370/100.1; 455/51.1; 455/54.1; 455/56.1; 375/107
[58] Field of Search ............... 370/95.1, 100.1, 105.4, 370/105.5, 108; 455/33, 51, 54, 56, 57; 375/106, 107

[56] References Cited

U.S. PATENT DOCUMENTS

| | | | |
|---|---|---|---|
| 3,902,161 | 8/1975 | Kiowski et al. | 340/147 SY |
| 4,218,654 | 8/1980 | Ogawa et al. | 370/97 |
| 4,255,814 | 3/1981 | Osborn | 455/51 |
| 4,317,220 | 2/1982 | Martin | 455/58 |
| 4,411,007 | 10/1983 | Rodman et al. | 455/51 |
| 4,414,661 | 11/1983 | Karlstrom | 370/95.1 |
| 4,472,802 | 9/1984 | Pin et al. | 370/100.1 |
| 4,475,246 | 10/1984 | Batlivala et al. | 455/51 |
| 4,516,269 | 5/1985 | Krinock | 455/51 |
| 4,597,105 | 6/1986 | Freeburg | 455/56 |
| 4,696,051 | 9/1987 | Breeden | 455/33 |
| 4,696,052 | 9/1987 | Breeden | 455/51 |
| 5,003,617 | 3/1991 | Epsom et al. | 455/51 |

OTHER PUBLICATIONS

Hattori et al., "A New Modulation Scheme for Multi-Transmitter Simulcast Digital Mobil Radio Communication", Mar. 1979, pp. 83-88.

Primary Examiner—Benedict V. Safourek
Assistant Examiner—Alpus H. Hsu
Attorney, Agent, or Firm—Harold E. Meier

[57] ABSTRACT

A coherency generator for providing signals to control the time and phase coherency of data information signals in an overlap region of a simulcast system that comprises a control site and a plurality of remote broadcast sites. A channel card located at each remote site derives from the information signals a master clock signal for synchronizing the broadcast of data information on an RF carrier. At substantially regular intervals a transmit section of the coherency generator transmits a synchronization command signal after detecting a predetermined sequence of ones or zeros. A receive section of the coherency generator issues a reset pulse to the remote site channel card upon detecting a predetermined pattern of values of a preselected data bit, and following detection of the synchronization command pulse. The reset pulse clears the memory elements of the channel card, setting the phase of the clock signal.

10 Claims, 4 Drawing Sheets

METHOD AND APPARATUS FOR SETTING CLOCK SIGNALS TO PREDETERMINED PHASES AT REMOTE BROADCAST SITES IN SIMULCAST SYSTEMS

This is a continuation of application Ser. No. 382,264 filed Jul. 20, 1989 now U.S. Pat. No. 4,972,410.

FIELD OF INVENTION

The following disclosure relates to simultaneous broadcast (simulcast) systems in which two or more transmitters transmit the same information at the same time on the same radio frequency (RF), and more particularly relates to controlling the phase and time coherency of data information in a region in which the RF signals carrying the information overlap.

BACKGROUND OF THE INVENTION

Simultaneous broadcasting (simulcast) refers to the transmission of signals carrying the same information or intelligence from two different transmitter sites at the same time and on the same channel. The information carried by the transmitted signals may be either voice, in the form of an analog signal, or data, including digitized voice, in the form of a digital signal. Simulcast systems are used to improve reception coverage in dense metropolitan areas where buildings and other structures may hide or deflect reception of the broadcast signals; in hilly areas where communication signals are degraded by the terrain; and in areas where canyons and mountains exist.

Typically, a simulcast system has a control site and two or more remote transmitting sites. The control site processes and multiplexes signals such as high speed (9600 bits per second) data, low speed (150 bits per second) data, and voice and sends the signals to the transmitter sites over microwave radio links, cables and the like. The remote transmitter sites process the signals from the control site and broadcast the signals at approximately the same time on the same channel for reception by mobile receivers traveling through the simulcast region. The transmitter sites also contains receiving equipment that relays signals from mobile field units back to the control site.

For complete coverage of a geographical area, the RF signals broadcast from the remote transmitter sites overlap. The shape and size of the area in which the RF signals overlap can be controlled to some extent by appropriate placement and adjustment of the antennas and of the RF signal power at the remote sites. There always remains, however, some overlap. A mobile receiver passing through the overlap region must choose the signal from which to take the voice or data information on the channel to which it is tuned. The mobile receiver normally locks onto the strongest signal. In the overlap regions, however, the signal strength from two or more transmitters is so close, within 6 to 8 decibels of each other, that a receiver will not lock onto an RF signal from a single transmitter but will switch between the RF signals from the various transmitters. The information detected by the receiver will then be composed of a patchwork of signals received from the different sites. If the RF signals from the different transmit sites are not time coherent at the point of reception—that is to say, the same information carried by each RF signal does not arrive at the same time at the mobile receiver—some intelligence will be lost.

The problem is especially acute when information is in the form of digital data. The loss of even one digital bit will result in an incorrect digital word. For example, while receiving the RF signal from one transmitter, the first few bits of a digital word are detected. Then, the mobile receiver changes to the second transmitter's RF signal. That RF signal, carrying the same digital information, arrives late at the mobile receiver by the time to transmit one bit (one bit time). The receiver will then redetect the most recent bit and has no way of knowing that the bit it detected has been repeated. The detected digital word, therefore, will be incorrect.

To limit the degradation of the signal caused by the reception of two or more RF signals of more or less equal signal strength, each of the RF signals in the overlap region must be time coherent. Time coherency requires that the same information reach the receiver at the same time. This requires, therefore, that the differences in the amount of time that it takes a signal to travel from the control site, through the remote site, and to the overlap region be equalized by time delaying all signals but the one traveling the longest time.

For signals carrying high-speed data such as 9.6 kilobits per second data, time coherency in the overlap region is critical for good performance. As the speed of the data increases, the tolerance for incoherency between the same data information lessens. Simply maintaining the proper time delays is not sufficient to ensure time coherency. For the mobile receiver to detect properly the transmitted data bit, the data bit must be centered within the detector. If not centered, the probability that the data bit will be properly detected drops. The detection of the correct value of the data bit when the receiver switches between RF signals requires, therefore, close phase alignment (referred to hereafter as "phase coherency") of the data bits. Otherwise, the data bit detected following the switch will not be centered within the detector, thus decreasing the probability that the value of the data bit will be correctly detected. The fine control of the phase coherency necessary for high speed data information therefore requires, in addition to precisely set and maintained time delays, careful control of the timing of the broadcast of the data from the remote site. Known prior art simulcast systems, however, do not provide for controlling the timing of the broadcast at the remote site necessary for phase coherent data information within the overlap region.

SUMMARY OF THE INVENTION

The present invention provides a method and apparatus to control, in the region in which the RF signals from two or more remote site transmitters overlap, the time coherence of the intelligence carried by the RF signal, particularly data at speeds of 9.6 kilobits per second (KBPS) and higher. Within the overlap region, the difference between the receipt of the same data information carried by two different RF signals is ideally no greater than plus or minus one-quarter of a bit time. When the data information carried by the RF signals reaches the overlap region within one-quarter of a bit time of each other, the remote receive is able to reliably detect the data bits throughout the switching action. The RF signals and the data information signals are then time coherent, and the corresponding remote transmitter sites are synchronous with respect to each other.

To achieve this close time coherence, the synchronous timing characteristics of digital transmission media are utilized. Data information is sent to each remote site using synchronous digital transmission media, such as an RF or cable system whose line transmitters are driven by digital signals and whose line receiver outputs are digital signals. The digital signals must be transmitted according to a standard which permits the remote site to generate the required clock signal. One example of a standard is the T-1 standard developed by AT&T. In the preferred embodiment the T-1 time standard is utilized.

The synchronous nature of a digital signal transmitted using the T-1 standard, called a DS-1 signal, is used to provide the necessary control of the timing to broadcast the data information at the remote site. First, the DS-1 signal provides stable transmission from the control site to the remote site. Any time delay required to be inserted in the transmission path to equalize transmit time to the overlap region requires, after the initial calibration, very little additional maintenance. Second, the DS-1 signal provides a means for each remote site to generate clocking signals having substantially identical frequencies. The broadcast of the data information from the remote site is, therefore, completed at nearly identical data rates. Third, certain control data bits of the DS-1 signal are used to ensure that the data information is clocked out of the line receiver at the remote site with the phase synchronization necessary for phase coherency in the overlap region.

For use with digital synchronous transmission media, the present invention also provides a delay circuit that preserves the synchronization of the digital transmission signal to each remote site. The delay induced as a result of the delay circuit is easily and quickly changed with "DIP" switches providing, in the T-1 system, sixty-five one hundredths (0.65) of a microsecond resolution.

DETAILED DESCRIPTION OF THE DRAWINGS

Figure 1:
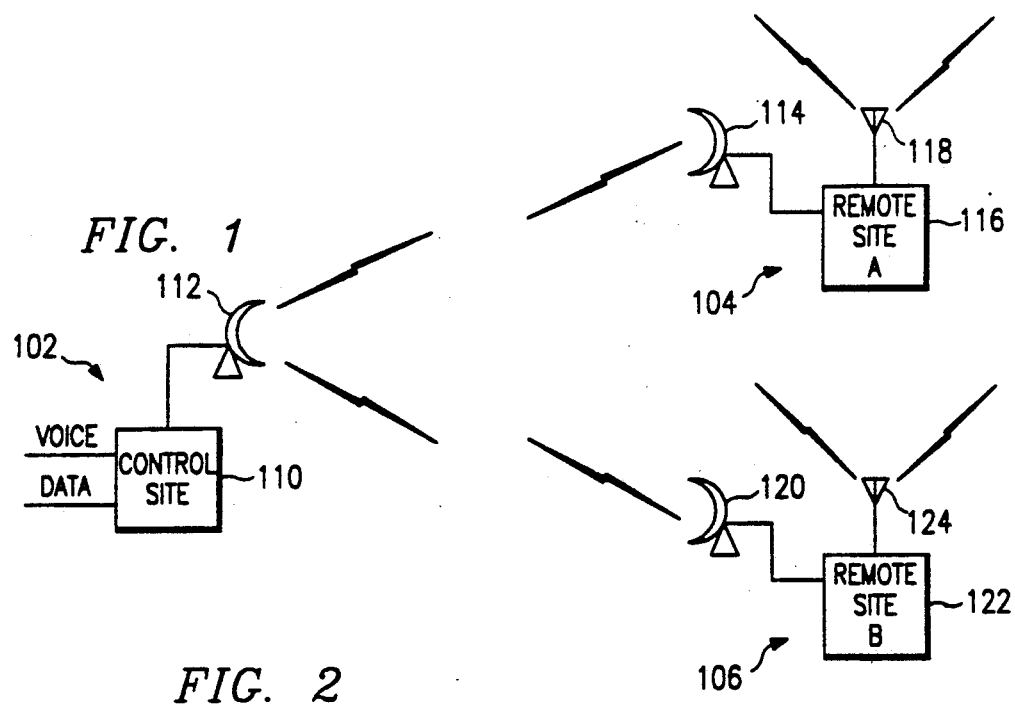
FIG. 1 is a pictorial representation of a simulcast system having a control site and the plurality of remote sites.

Referring to FIG. 1, a simple simulcast system has a control site 102 and two remote sites 104 and 106. Control site 102 receives voice and data information—data information includes digitized voice information—that is to be broadcast over the simulcast system from the remote receivers or locally generated, such as with a radio console dispatcher. The control site includes circuits 110 to process both the voice and data signals that are to be transmitted to the remote sites for broadcast. Microwave link 112 sends and receives voice and data information to and from each of the remote sites. Although a microwave link is shown, other types of radio frequency (RF) and cable systems, or combinations thereof, may serve as transmission/receive links to send and receive voice and data information to and from the remote sites.

The same channels of voice and data information are sent to each remote site. Remote site 104 receives the voice and data information by means of a microwave antenna 108. Circuitry 116 associated with the remote site processes the signals to be broadcast on antenna 118 at radio frequencies. Similarly, remote site 106 receives the voice and data information by means of an antenna 120, processes with circuitry 122 and broadcasts on antenna 124 at radio frequencies. The simulcast system may have any number of remote sites and a remote site may be co-located with the control site. For purposes of this description, only two remote sites have been shown.

Figure 2:
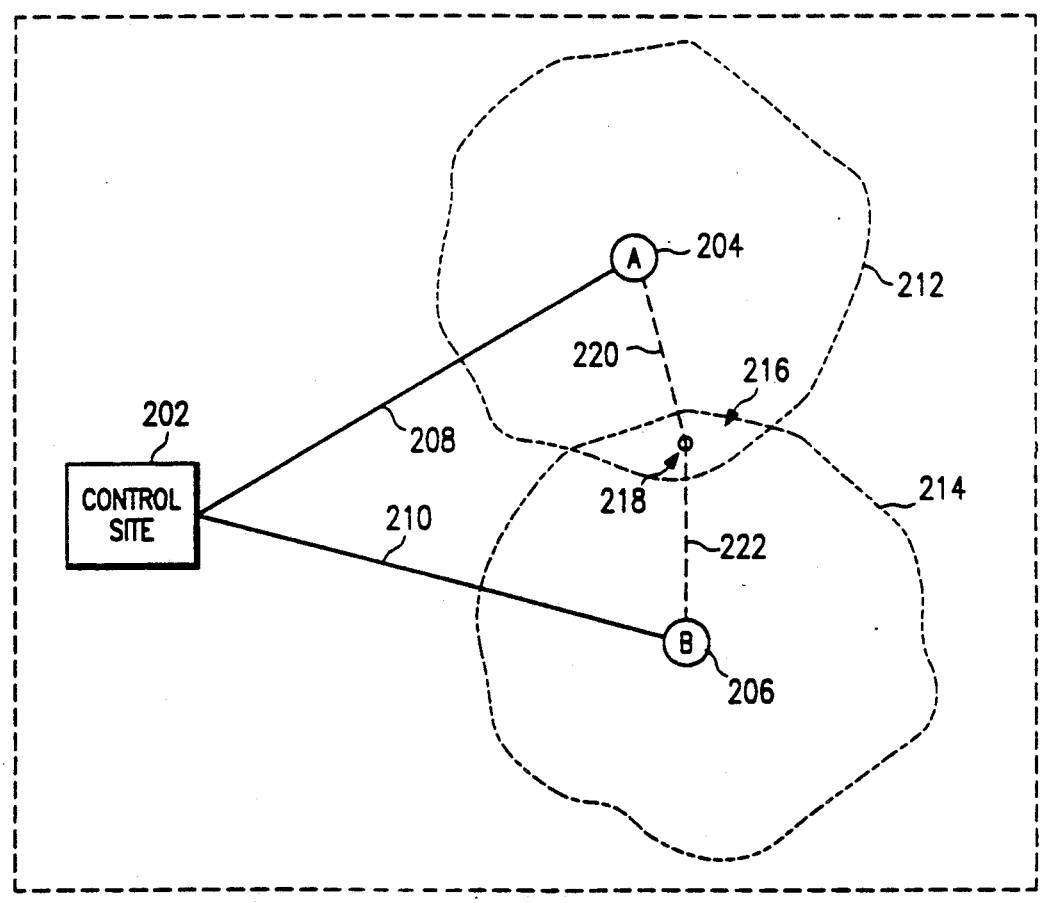
FIG. 2 is a representation of the broadcast patterns of two remote sites showing an overlap region.

Turning now to FIG. 2, there is shown a geographical overview of a simulcast system having a control site 202 and two remote sites 204 and 206. The voice and data information processed by control site 202 are sent to remote site 204 via communications link 208, and to remote site 206 via communications link 210. Each remote site receives the same channels, and broadcasts the same channels on the same RF carrier frequencies at approximately the same time.

As is illustrated by line 212, the broadcast pattern of remote site 204 overlaps the broadcast pattern, as illustrated by line 214, of remote site 206. In the region of overlap 216, the signal strength of the RF carriers for each channel are relatively equal and differ only by 6 to 8 decibels. A mobile receiver traveling through this area will not lock onto a single RF signal, but will switch between the RF signals from the two remote sites. The information detected by the mobile receiver will therefore be a time multiplex composite of information carried by the RF signals from both remote sites. The information carried by the RF signals must, therefore, be sufficiently coherent with respect to each other that no information is lost or repeated when the receiver switches from one RF signal to the other.

When a channel carries data information the loss or redetection of a single digital bit results in an incorrect digital word. To avoid erroneous bit detection, the coherency of the information carried by the RF signal from each remote site must be carefully controlled and maintained, especially at high data rates. The present invention permits control of the coherence of the information broadcast by each remote site in the form of digital data having rates of 9.6 kilobits per second (KBPS) and higher. Although this invention was designed around the requirement for 9.6 KBPS data, it is fully functional at 19.2 KBPS, 9.6 KBPS, 4.8 KBPS, 2.4 KBPS, 1.2 KBPS, 600 bits per second (BPS), 300 BPS, and 150 BPS.

Most receivers detect the value of a received data bit when it is centered within a detection window. If, after the mobile receiver switches reception from one remote site to the other remote site, the next received data bit is not time coherent with the previously detected data bit, the most recently received data bit will not be properly centered within the detection window. The probability of detecting the correct value for the data bit drops significantly when there is more than one-quarter of a bit time difference between the arrival of the same data bit from one remote site and its arrival from another remote site. When the time difference falls between one-quarter to one-half bit time, the acceptability of the detected intelligence drops. With differences of greater than one-half bit time, intelligence is essentially lost. Therefore, the coherency of the information signals from each remote site within the overlap region must be maintained to within one-quarter of a bit time for best performance.

As with all simulcast systems, the first step to ensuring time coherency within the overlap region is to equalize the time traveled by the same information signal over the various paths it travels to reach the overlap region. If the distance represented by link 208 and dashed line 220 does not equal the distance represented by line 210 and dashed line 222, the information traveling the shorter path must be time delayed to compensate for the shorter distance. If the information is high speed data, the timing of the remote site operation for the broadcast of data signals must be controlled and maintained to ensure that the time delay of the shorter path results in time coherency of the data signals within the overlap region.

The method of the present invention utilizes the synchronous nature of high speed synchronous digital transmission media. These media include RF and cable systems with line transmitters that are driven by a digital signal, and with line receivers that have a digital signal output. The use of synchronous digital transmission media provides: stable links between the control site and the remote sites; a means to easily delay all channel of data information from the control site to a remote site; and foremost, a means to control the timing of the data information when broadcast from the remote sites.

There are available several well-known standards with which to transmit synchronous data. The preferred embodiment of the present invention utilizes the T-1 standard. The T-1 standard, developed and used by AT&T is very widely used in the telecommunications industry for the transmission of data information. Most commercially available simulcast systems, such as those produced by General Electric Corporation, have the capability to transmit data information using the T-1 standard.

With the T-1 standard, the line transmitter, such as a microwave transmitter, is provided a digital signal of 1.544 megabits per second (MBPS), called a DS-1 signal. The DS-1 signal is subdivided into frames, each frame having 193 bits. Each frame is, in turn, divided into twenty-four channel slots, each an eight-bit word, and a frame bit indicating the beginning of the frame. Each data channel is assigned an eight-bit word sometimes called a time window or a channel slot, in which to transmit the data information. The channels of data are therefore time multiplexed within each frame.

Channel banks, such as those manufactured by the NEC Corporation, multiplex the channels of data using the T-1 standard. Within each channel bank there are channel cards that receive the data information at 9.6 kilobits per second (KBPS), and provide it to the channel bank at 1.544 MBPS to be placed within an assigned channel slot within the bank. The channel bank is used both at the control site and at the remote site for transmitting and receiving the DS-1 signals. Typically, one channel bank is used for each remote site. Simulcast systems using other standards for synchronous data transmission may also be used in accordance with the teachings of the present invention.

The most salient feature of the T-1 standard is that a clock signal can be derived at the remote site having the same frequency as the clock used at the control site to clock into the channel bank at the remote site the data information. Thus, not only is the synchronization of the data information maintained throughout transmission to the remote site, the data information is taken from the channel banks and provided to all the remote site transmitters for broadcast at the same data rate.

The phasing of the clocks must also be synchronized at each remote site to create the necessary time coherency of the data information within the overlap region. This clock signal is counted down to the 9.6 KHz clock signal used for clocking out the data information. In counting down the 1.544 MHz clocking signal derived from the DS-1 signal at the remote site to the 9.6 KHz clock signal, the phase of the 9.6 KHz signal depends on the state of logic circuitry used to count down the 1.544 MHz when it begins to count down. Modem-like circuitry of the channel card also has a multiple number of states that effect the phase at which data is clocked out. Because there is no way of knowing the state of the circuitry of the channel card with certainty due to the possibility, for example, of a brief power failure, it must be periodically set to a known state. This resetting is referred to as resynchronization Referring now to FIG. 3, there is shown a block diagram of the equipment of the simulcast system and the additional equipment used to synchronize the phases of the 9.6 KHz clocks at the remote sites. There is shown three channel banks 302, 304, and 306, each associated with one remote site. Typically, one channel bank is used per remote site. However, one channel bank may be used to send information signals to more than one remote site with a device (not shown) that duplicates the output of a channel bank. Within each channel bank there are one or more channel cards. There is one channel card for each channel for interfacing voice or data information with the synchronous digital transmission media. Each channel bank is configured to 24 channel slots, each capable of sending data at a rate of 64 KBPS on a time multiplexed DS-1 line. Multiplexing is controlled by common cards in the channel bank that direct in sequence the channel cards to dump, at a rate of 1.544 MBPS, eight data bits into the channel slot or time window within the frame corresponding to the particular channel.

If more than one channel bank is used, the data information provided to each must be properly synchronized with respect to a master reference clock so that the information is synchronously transmitted from each channel bank. The channel bank timing from one channel bank is provided to the others so that no differences in the 1.544 MBPS transmission rates between channel banks affects the synchronization of the data information signal. The master clock reference (9.6 KBPS) is selected from a data channel clock supplied by one or more channel banks. As shown, the channel clocks from each channel bank are taken on lines 308, 310 and 312 to a clock selector 314, which generates on line 316 a master reference clock signal using one of the channel clocks. The master reference clock signal is provided to synchronizer 318 along with data for each data channel on data bus 320 from a trunking system (not shown). By operation of the synchronizer 318 the data is synchronized with the master clock reference and provides the synchronized data on bus 322 to each channel bank. Synchronizer 318 also provides the master reference clock signal on line 324 to each channel bank for clocking the synchronized data into the channel cards.

The channel banks 302, 304 and 306 generate and transmit the DS-1 signal data over T-1 lines 326, 328 and 330, respectively.

Before the DS-1 signal leaves the control site, it may be passed through a T-1 delay. Associated with channel banks 302, and 304 are, respectively, T-1 delays 332 and 334. There is no T-1 delay shown associated with channel bank 306 because the distance traveled by the data information from this channel bank to an overlap region is longer than the distance from channel banks 302 and 304. T-1 delays 332 and 334 are set with the appropriate delay to compensate for this difference in distance. Because of the synchronous characteristics of the T-1 signal each data channel of a channel bank is delayed the same amount.

Any number of known prior art devices may be used to create the required delay. The device chosen, however, must have a resolution adjustment in 0.65 microsecond intervals to provide the fine control necessary to achieve the coherence in an overlap region of high speed data information and preserve the synchronization of the DS-1 signal. Once fixed, the T-1 delay requires little maintenance because of the stability of the T-1 lines to the remote site.

From T-1 delay 332, T-1 line 336 transmits the DS-1 signal to a T-1 synchronous network 340. Similarly, line 338 transmits the output of T-1 delay 334 to the synchronous network 340.

The T-1 synchronous network 340 may be either a cable system or an RF system, or a combination of both, that maintains the synchronization of the DS-1 signals. In most applications, the T-1 synchronous network is comprised of microwave links.

Figure 3:
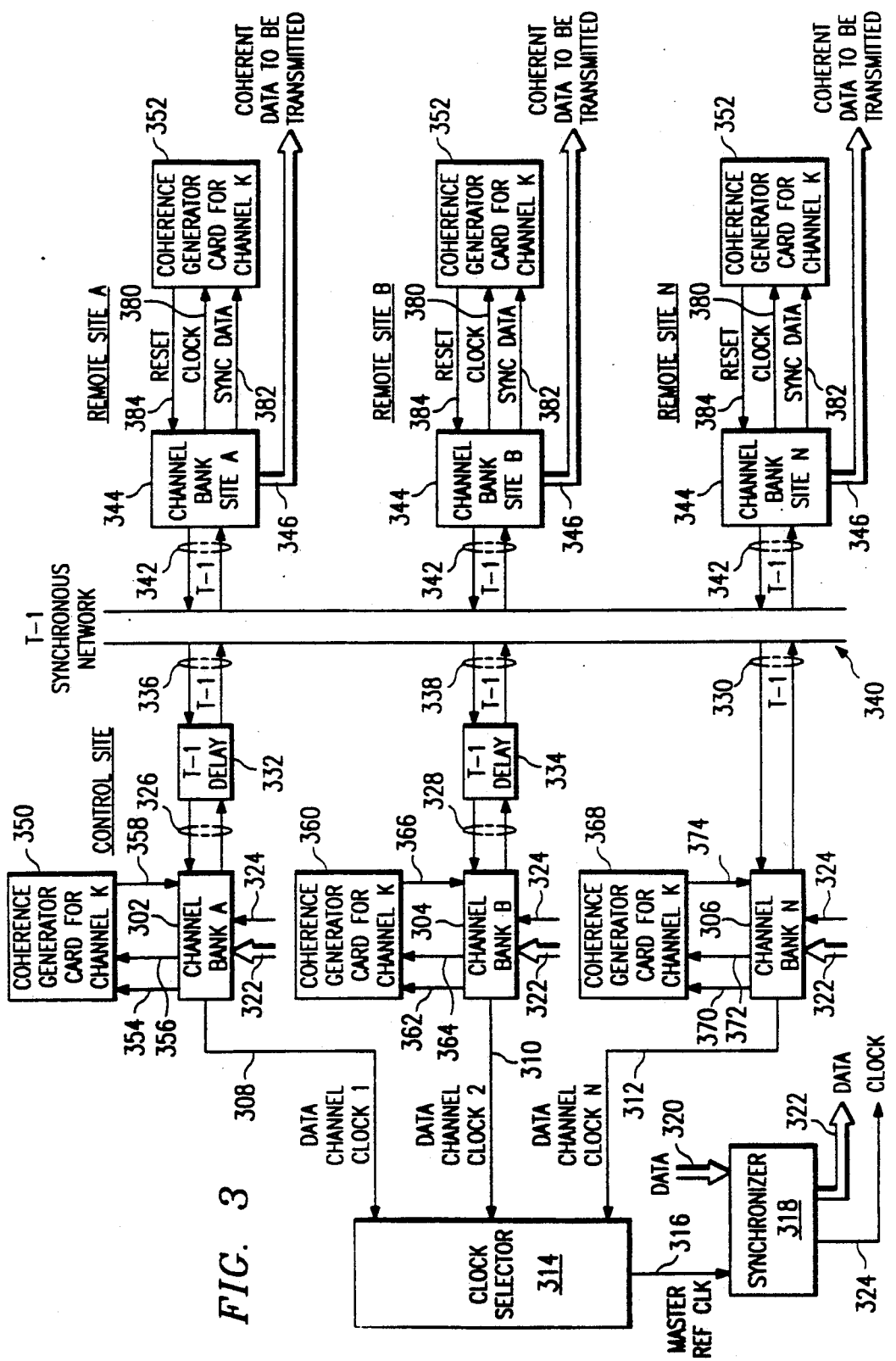
FIG. 3 is a block diagram of the equipment at the control site and three remote sites for controlling the coherency of data information signals within the overlap region.

Three remote sites are illustrated in FIG. 3. For convenience, since each remote site functions in the same manner, only one remote site will be described, the description being applicable to each remote site. The DS-1 signals from the synchronous network 340 are supplied via T-1 line 342 to channel bank 344. The receive section of channel bank 344 demultiplexes the DS-1 signal from the T-1 line 342. A circuit within the channel bank 344 derives from the DS-1 signal a 1.544 MHz clock signal. Additional circuitry on each channel card counts down the 1.544 MHz clock or clock derived signal to a 9.6 KHz clock signal with which it clocks out the data information in the DS-1 signal from the assigned channel slot. The data clocked out of each channel card at 9.6 (KBPS) is sent on bus 346 to the transmitter (not shown) associated with the remote site for immediate broadcast.

Continuing with reference to FIG. 3, a periodic resynchronization process of the 9.6 KHz clock signal is completed one data channel at a time with the use of a coherence generator associated with each channel card in each channel bank at both the control and remote sites. The coherence generator has both a transmit section and a receive section. Only one coherence generator card is shown for a channel K for each channel bank at the control site. Similarly, only the coherence generator for channel K is shown at each remote site. The following description of the resynchronization process is with reference only to channel K, but is equally applicable to all data channels and data channel cards. Furthermore, at the control site, the description of the function of the coherence generator will be described for channel bank 302 and coherence generator 350.

Channel banks 304 and 306 interface in a similar manner with coherence generators 360 and 368, respectively.

The simulcast system including trunked simulcast (not shown), from which data is received on bus 320, determines when and how frequently a particular channel is to be resynchronized. For the resynchronization process to begin for channel K, the trunking system supplies on channel K of data bus 320 a series of consecutive data bits with values equal to one or to zero, depending on the system. For convenience, N consecutive ones will be used hereinafter to represent the synchronization command from the trunking system. Like other data signals from the trunking system, a command for resynchronization on channel K is passed through synchronizer 318 and output on the line for channel K in bus 322. At channel bank 302, the data on the channel K line of bus 322 is provided to the data channel card for channel K. The data provided to the data channel card K is also provided via bridge 354 to the coherence generator 350. The master reference clock on line 324 is also provided to the coherence generator on line 356. The coherence generator looks for N consecutive ones indicating that channel K is to be resynchronized. When the N consecutive number of ones is detected by the coherence generator 350, a pulse signal indicating that the remote site is to synchronize is provided to the channel card via line 358.

To understand how the synchronization command is sent to the remote site, a brief description of the eight bits used to fill each channel slot of the DS-1 signal is required. For the transmission of 9.6 KBPS data, only the first three bits of the eight bit channel slot are used. The remaining five bits within the channel slot are provided by the channel card and are used for different functions. In most channel banks with digital synchronized channel cards, such as the NEC Corporation's described earlier, there is one bit that is never used and always tied to a value of one. For use with the invention, this data bit is, instead, coupled through line 358 to the coherence generator so that it serves to as a synchronization command bit for transmitting to the remote site the synchronization command.

At the remote site, the receive section of the coherence generator 352 functions with the digital synchronous card for data channel K for detecting the synchronization command and completing the process of synchronization of the 9.6 KHz clock for data channel K. The coherence generator 352 is coupled to the channel card for channel K through lines 380 and 382. Line 380 provides the 9.6 KHz clock signal to the coherence generator and lines 382, actually comprised of two lines, transmits to the coherence generator certain data bits from the DS-1 signal. One line provides the synchronization command bit. The other line provides another data bit of the eight-bit word for each data channel. Its function is described below.

When the coherence generator 352 at the remote site detects the synchronization command on the synchronization command bit, presence of the synchronization pulse, the resynchronization process is initiated.

Resynchronization of the 9.6 KHz clock signal for each data channel in the channel bank 344 at the remote site includes resetting all counters and certain memory devices, namely the first-in and first-out memories of the channel card, to a known state. The coherence generator issues a reset pulse on line 384 to the channel card for resetting. Resetting to a zero state is the most easily accomplished. The zero state is obtained by "flushing" all the counters and first-in, first-out memories (FIFOs) of the data channel card.

Resetting all the counters to a zero state places the circuitry for counting down the 1.544 MHz clock or clock derived signal to 9.6 KHz in the zero state so that the 9.6 KHz clock begins at zero phase. The phase of all the data channel clocks for channel K are thereby synchronized.

The FIFOs of the data channel card must be cleared to ensure that each channel of the simulcast system is synchronized with respect to the other. The data channel card acts as a modem. It is always in one of several states, each state corresponding to the FIFO's and the clock signal. All the channel cards in the system for channel K will therefore be in the same state. Randomly resetting the counters and FIFOs of a channel card without knowing the state the channel card may, however, result in the data clocked out of the channel card being phase-shifted by ninety degrees and/or inverted. This phase-shifting drastically affects the coherency of the data information for a particular channel and between channels in the same system. In most simulcast systems, there is more than one data channel (in fact, channels carry both voice and data), and the mobile receivers frequently shift between them. Since channels are resynchronized only when there is time to do so—usually one at a time—they must be synchronized when they are in one known state to preserve overall system coherency.

To maintain the phase coherency between every data channel at the remote site, therefore, resetting of the counters and FIFOs occurs only when the channel card is in a known state. A data status bit is used to time the issuing of the reset pulse on line 384 from the coherence generator. Not every frame of the DS-1 signal is required for a particular channel to transmit the data bits of a 9.6 KBPS data signal. The data channel card at the control site, therefore, fills the data bits with, what for convenience will be called, "bad bits". The data status bit is used to indicate whether or not the three data bits in the particular channel time slot within the particular frame are bad bits. Because of the nature of the T-1 standard and the 9.6 KBPS data information, there will be two consecutive frames in which the same channel time slot will have a data status bit indicating good data. At the beginning of the next clock cycle of the 9.6 KHz clock after the clock cycle in which the second consecutive data status bit appears, the channel card is in a known state. The data status bit is therefore also provided to the coherence generator on one of the lines 382. When the coherence generator detects two consecutive good data status bits in consecutive clock cycles, a pulse is issued on the reset line 384 at the beginning of the next 9.6 KHz clock cycle to reinitialize all the counters and all the FIFOs.

Figure 4:
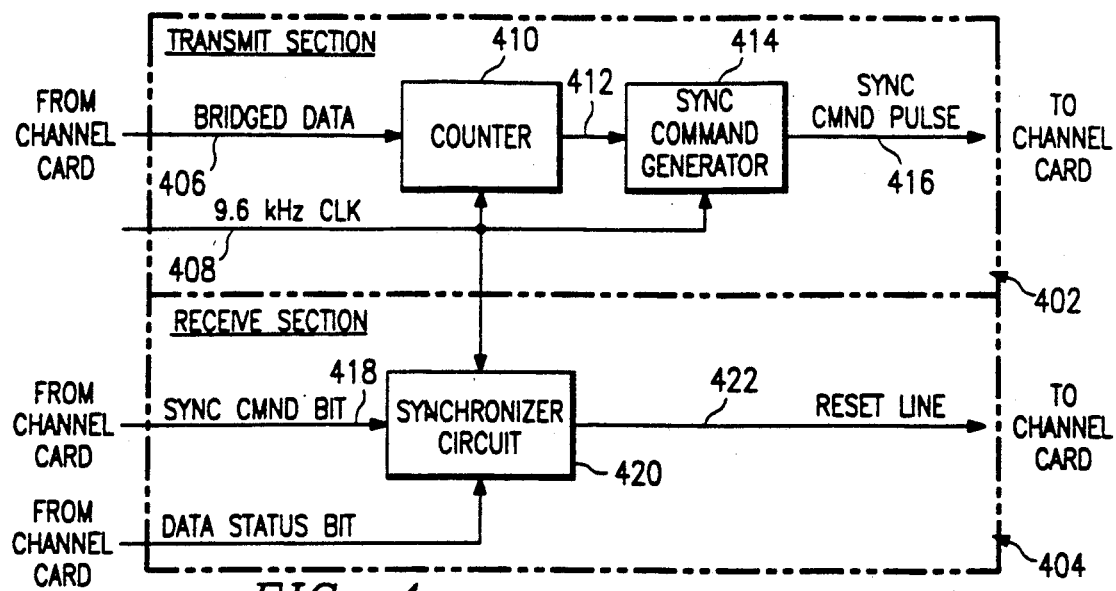
FIG. 4 is a circuit block diagram of a coherence generator card to be used with a channel bank of either a control site or a remote site in a simulcast system.

Referring now to FIG. 4, there is shown a circuit block diagram of the coherence generator. The coherence generator has two sections: (1) a transmit section 402; and (2) a receive section 404. Line 406 carries the bridge data from the data channel card to the transmit section of the coherence generator. Line 408 carries the 9.6 KHz master reference clock signal from the data channel card. The bridge data is supplied to a counter circuit 410 that counts only consecutive ones or zeros, depending on what is chosen to be the data from the trunking system used to initiate the synchronization of the remote sites. The 9.6 KHz clock is also supplied to counter circuit 410 to supply the necessary timing for counting the ones or zeros. The number of ones or zeros to be counted may be set using a dip switch (not shown) on the coherence generator. Once the predetermined number of ones or zeros have been counted, a pulse issues from counter 410 on line 412. The sync command generator 414 receives the pulse on line 412 and generates a single pulse on line 416 of predetermined duration. The pulse on line 416 is provided to the channel card for setting the synchronization value command bit with the synchronization command.

The receive section 404 is coupled to each data channel card at each remote site. It receives the 9.6 KHz clock signal generated by the data channel card at the remote site on line 408. The data channel card supplies to a synchronizer circuit 420 on line 418 the value of the data bit used to transmit the sync command to the remote site. The data channel card also supplies to the synchronizer circuit 420 the value of the data status bit on line 419. The synchronizer circuit 420 is a state machine that is comprised of logic gates and issues on a reset line 422 the appropriate pulse when two data status bits indicating good data are received in two consecutive frames following the receipt of a synchronize command bit on line 418. The reset line 422 is coupled to the data channel card and provides the command pulse to reset all the counters and FIFOs on the data channel card.

Figure 5:
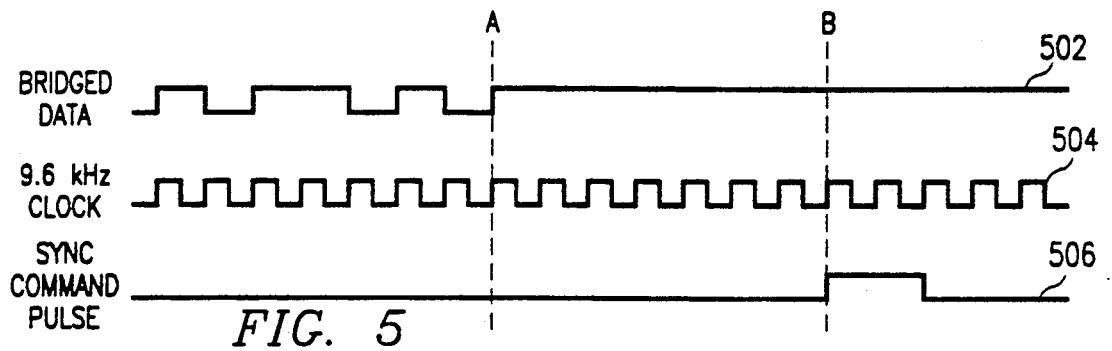
FIG. 5 is a timing diagram for the transmit section of the coherence generator.

Referring now to FIG. 5, there is shown the timing diagram for the transmit section 402 of the coherence generator. The bridge data from the data channel card is illustrated by line 502. Line 504 illustrates the 9.6 KHz master reference clock from the data channel card. When the trunking system generates the channel synchronize command for all the remote sites, as already discussed, it sends out a string of consecutive ones or zeros. Line 502 is an example in which consecutive ones are sent by the trunking system to initiate resynchronization of a channel at the remote sites. Dotted lines A and B denote the beginning and the end, respectively, of the period of consecutive ones. When the coherency generator counts the last consecutive one required to begin initiation of the resynchronization sequence, the synchronization command, represented by line 506, goes high for a period of 200 microseconds. Since the frame of a DS-1 signal is 125 microseconds long, the synchronization command pulse must last more than 125 microseconds to ensure that the data channel card sets to a high data level the synchronization command bit to transmit the synchronization command. If the synchronization command pulse is less than 125 microseconds in duration, the synchronization command line may return to a low level before the data channel card can set the synchronization command bit to transmit the synchronization command.

Figure 6:
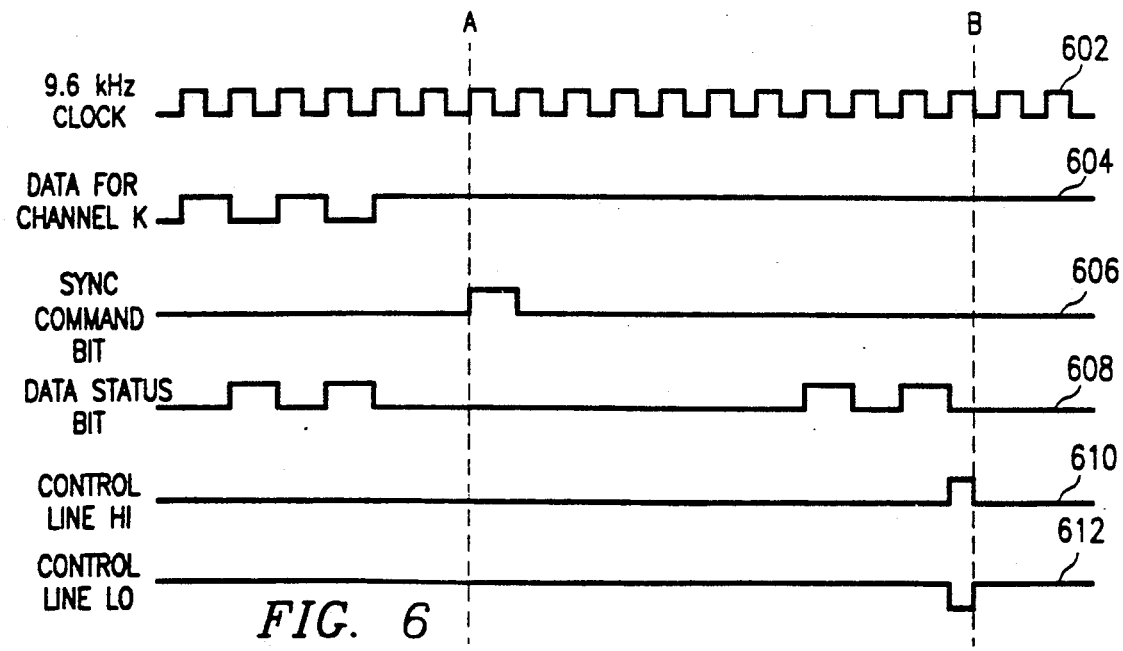
FIG. 6 is a timing diagram for the receive section of the coherence generator.

Referring now to FIG. 6, there is shown a timing diagram for the receive section 404 of the coherency generator of FIG. 4. Line 602 illustrates the 9.6 KHz clock signal generated by the data channel card from the DS-1 signal. Line 604 represents the 9.6 KBPS data that the channel card supplies to the transmitter equipment at the remote site. Line 606 represents the synchronization command bit and line 608 represents the data status bit. The resynchronization process at the remote site begins at dotted line A when the synchronization command bit goes high. At this point in time, the synchronizer generator 414 of the coherency generator begins to look for the pattern of data status bits in consecutive frames, as shown by line 608. The synchronizer generator 414 ignores the value of the data status bit until the synchronization command bit goes high, as shown by line 610, indicating a synchronization command. The synchronizer generator 414 issues a short pulse at the beginning of the next clock cycle following the receipt of the second data status bit. Line 612 is a complement of line 610 and is provided for use with selected data channel cards to reinitialize all counters and FIFOs. Dotted line B delineates the end of the synchronization process.

Figure 7:
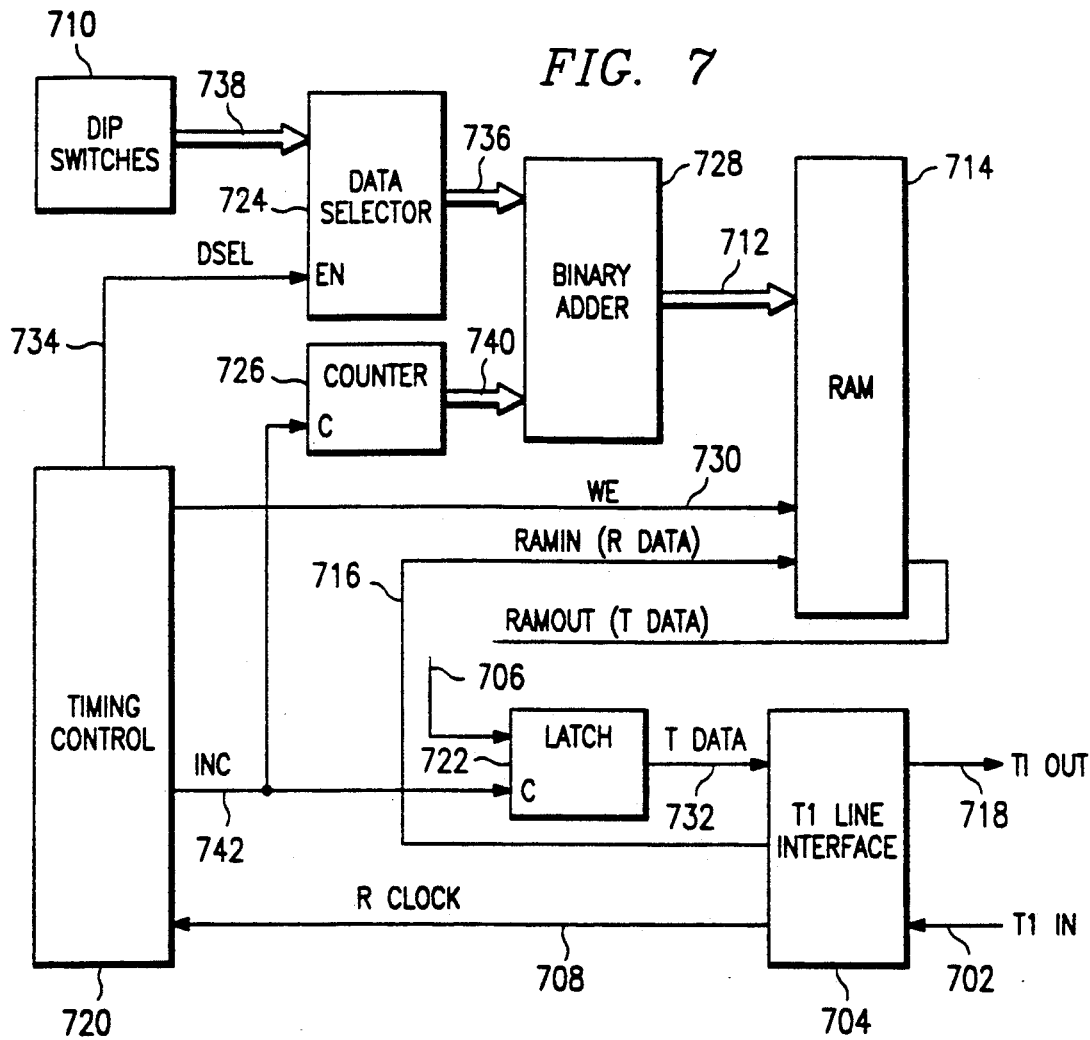
FIG. 7 is a block diagram of a T-1 delay circuit.

Referring now to FIG. 7, there is shown a delay circuit that provides the resolution necessary to tightly control the coherence of high speed data information without disturbing the synchronization of the DS-1 signal. The delay circuit has three sections: a T-1 line interface; timing circuitry; and memory circuitry.

The T-1 line interface 704 receives on T-1 line 702 the DS-1 signal and converts it from an Alternating Mark Inversion (AMI) signal to a TTL level signal. Clock recovery circuitry within the T-1 line interface recovers from the DS-1 signal a T-1 clock signal having a frequency of 1.544 MHz. The T-1 line interface provides the T-1 clock signal, called the receiver clock, on line 708 to timing control circuit 720. The T-1 line interface also provides the TTL level DS-1 signal, called received data, on RAMIN line 716 to the 1×16K Random Access Memory (RAM) 714.

The timing circuitry is comprised of the timing control circuit 720 and a latch 722. The timing control circuit 720 functions essentially as a state machine with which to control the operation of the memory section. The timing circuitry runs asynchronously on a 10 MHz clock signal from an on-board crystal oscillator (not shown). When a leading edge of the 1.544 MHz receiver clock signal on line 708 is detected by the timing control circuit 702, the timing control circuit initiates and performs a sequence of steps.

The step is the setting of a memory address for writing the received data on line 716 in to the 16K RAM 714. The timing control circuit 720 provides to a data selector 724 on line 734 an appropriate data select command so that the data on bus 738 generated by the "DIP" switches 710 is placed on bus 726. After the write address is generated and provided to the 16K RAM, the timing control circuit provides the appropriate signal on line 730 (the write enable command) to enable the 16K RAM to store at the write address the received data on the RAMIN line 716.

Next in the sequence of steps is the generation of the memory address from which to read (the read address) the data to be transmitted (transmit data). The read address is generated by the timing control circuit providing the appropriate data Select command on line 730 to a data selector 724 so as not to select the data on bus 730 from the DIP switches 710. The timing control circuit then removes the write enable command from line 730 to permit the 16K RAM to read out on to the RAMOUT line 706 the data stored at the read address.

In the final step, the timing control circuit 720 issues an increment command on line 742 that latches the transmit data on the RAMOUT line in the latch 722. The latch provides the transmit data on line 732 to the T-1 line interface for conversion back to AMI levels for synchronous transmission at 1.544 MBPS on the T-1 out line 718. Also as part of the final step, the increment command from the timing control circuit 720 is provided by line 742 to the clock input of counter 726, causing the counter to count by one. The timing control circuit 720 then waits for the next leading edge of 1.544 MHz clock signal to begin again the sequence of writing and reading received data and transmit data signals.

In summation, the timing circuitry causes, in an asynchronous manner, a received data bit to be written, and to be read and provided to the T-1 line interface a transmit data bit within one 1.544 MHz clock cycle. The effect is to delay by a fixed number of 1.544 MHz clock cycles a T-1 data bit.

The memory circuitry includes the 16K RAM 714 and an address generator comprised of a binary adder 728, the counter 726, the data selector 724 and the DIP switches 710. The write and read memory addresses are generated by binary adder 728 and provided to the 16K RAM 714 on bus 712. Binary adder 728 adds the value of counter 726, appearing on bus 740, with the data value appearing on bus 736 from the data selector 724. With the data select command on line 734, the timing control circuit 720 enables and disables data selector 724 from providing to the bus 736 the data appearing on bus 738 from DIP switches 710. The write address is, therefore, equal to the value stored in the counter plus the value of the setting on the DIP switches. The read address is just the value stored in the counter. Basically, the delay circuit reads the data bit received in the T-1 line into a specific address of the RAM and, a predetermined time later, reads it from the same address. This predetermined delay is set with the DIP switches and is equal to the time delay necessary for achieving time coherency within the overlap region. The number set by the DIP switches is equal to the number of 1.544 MHz clock cycles which a data bit in the T-1 signal will be delayed. The resolution of the time delay is therefore equal to one cycle of the 1.544 MHz clock signal, or 0.65 microseconds. This resolution is sufficient for the fine control of the coherency of the data information in the overlap region. Instead of DIP switches, software parameters can be used to select delay.

The invention has been described in connection with a preferred embodiment. This description is not intended to limit the scope of the invention to the particular form set forth, but, on the contrary, it is intended to cover such alternatives, modifications, and equivalents as may be included within the spirit and scope of the invention as defined in the appended claims.

We claim:

1. A coherency generator for setting the phase of a clock signal having a predetermined frequency to a known phase in order to achieve bit coherency in an overlap region of a simulcast system, the simulcast system having a plurality of remote broadcast sites each of which transmit the same data signals on the same channels, the clock signal controlling the timing of the transmission of data from a line receiver to a broadcast transmitter at each remote broadcast site, the coherency generator comprising:

means for detecting a predetermined value of a first preselected data bit in a synchronous data transmission signal;

means for detecting a predetermined pattern of data values from preselected data bits in the synchronous data transmission signal to place all line receivers in a simulcast system receiving the synchronous data transmission signal in a known logic state; and means for setting a clock signal derived at the remote site from the synchronous data transmission signal to a predetermined phase upon detecting the predetermined pattern of data values of the preselected data bits following detection of the predetermined value of the first preselected data bit.

2. The coherency generator as set forth in claim 1 wherein the means for detecting a predetermined value of a first preselected data bit and the means for detecting a predetermined pattern of data values from the second preselected data bits in the synchronous data transmission signal includes a logic circuit.

3. The coherency generator as set forth in claim 2:
wherein each line receiver at a remote broadcast site includes a channel card for providing the first preselected data bit and the second preselected data bit to the logic circuit; and
wherein the means for setting a clock signal to a predetermined phase includes a reset line from the logic circuit to the channel card, the logic circuit generating a reset command on the reset line that clears and resets memory elements on the channel card.

4. The coherency generator according to claim 1 further comprising a means for generating a synchronous command signal for causing the means for generating the synchronous data transmission signal to set the value of the first preselected data bit to the predetermined value.

5. The coherency generator according to claim 4 wherein the synchronization command is received at substantially regular intervals.

6. A method for setting phases of clock signals having a predetermined frequency to a known phase in order to achieve bit coherency in an overlap region of a simulcast system, the simulcast system having a plurality of remote broadcast sites each of which transmit the same data signals on the same channels, controlling the timing of the transmission of data from a line receiver to a broadcast transmitter at each remote broadcast site, the method comprising:

detecting a predetermined value of a first preselected data bit in a synchronous data transmission signal;
detecting a predetermined pattern of data values of preselected data bits in the synchronous data transmission signal to place all line receivers in a simulcast system receiving the synchronous data transmission signal in a known logic state; and
setting a clock signal derived from the synchronous data transmission signal at the remote site to a predetermined phase upon detecting the predetermined pattern of data values of the preselected data bits following detection of the predetermined value of the first preselected data bit.

7. The method for setting phases of clock signals as set forth in claim 6 further comprising the steps of:
setting a predetermined data bit in the synchronous data transmission signal to a predetermined value; and
transmitting the synchronous data transmission signal to a plurality of remote broadcast sites.

8. The method for setting phases of clock signals as set forth in claim 7 further comprising the step of deriving from the synchronous data transmission the clock signal at each remote site.

9. The method for setting phases of clock signals as set forth in claim 6 wherein the step of setting a clock signal to a predetermined phase is comprised of a step of resetting memory elements in a channel card within a line receiver receiving the synchronous data transmission signal at the remote broadcast site.

10. The method for setting phases of clock as set forth in claim 9 wherein the channel card derives the clock signal from the synchronous data transmission signal, the clock signal timing the transfer of data transmitted on the synchronous data transmission signal from the channel card to a broadcast transmitter at the remote site.

* * * * *